United States Patent
Schipper (10) Patent No.: US 7,561,946 B1
(45) Date of Patent: Jul. 14, 2009

(54) REAL TIME CORRECTION OF AIRCRAFT FLIGHT CONFIGURATION

(75) Inventor: John F. Schipper, Palo Alto, CA (US)

(73) Assignee: The United States of America as Represented by the Administrator of the National Aeronautics and Space Administration, Washington, DC (US)

( * ) Notice: Subject to any disclaimer, the term of this patent is extended or adjusted under 35 U.S.C. 154(b) by 468 days.

(21) Appl. No.: 11/066,651

(22) Filed: Feb. 22, 2005

(51) Int. Cl.
*G06F 17/13* (2006.01)
*G06F 19/00* (2006.01)

(52) U.S. Cl. .......................................... 701/8; 701/14

(58) Field of Classification Search ................ None
See application file for complete search history.

(56) References Cited

U.S. PATENT DOCUMENTS

| | | | | |
|---|---|---|---|---|
| 4,924,401 A | * | 5/1990 | Bice et al. ................. | 701/6 |
| 5,075,685 A | * | 12/1991 | Vermilion et al. .......... | 340/970 |
| 5,136,512 A | * | 8/1992 | Le Borne .................. | 701/301 |
| 7,075,457 B1 | * | 7/2006 | Chidester et al. .......... | 340/963 |
| 7,098,810 B2 | * | 8/2006 | Bateman et al. ........... | 340/963 |

* cited by examiner

*Primary Examiner*—Michael J. Zanelli
(74) *Attorney, Agent, or Firm*—John F. Schipper; Robert M. Padilla (57) ABSTRACT

Method and system for monitoring and analyzing, in real time, variation with time of an aircraft flight parameter. A time-dependent recovery band, defined by first and second recovery band boundaries that are spaced apart at at least one time point, is constructed for a selected flight parameter and for a selected time recovery time interval length $\Delta t(FP;rec)$. A flight parameter, having a value $FP(t=t_p)$ at a time $t=t_p$, is likely to be able to recover to a reference flight parameter value $FP(t';ref)$, lying in a band of reference flight parameter values $FP(t';ref;CB)$, within a time interval given by $t_p \leq t' \leq t_p \Delta t(FP;rec)$, if (or only if) the flight parameter value lies between the first and second recovery band boundary traces.

20 Claims, 8 Drawing Sheets

REAL TIME CORRECTION OF AIRCRAFT FLIGHT CONFIGURATION

ORIGIN OF THE INVENTION

This invention was made by an employee of the U.S. government. The U.S. government has the right to make, use and/or sell the invention described herein without payment of compensation therefor, including but not limited to payment of royalties.

FIELD OF THE INVENTION

This invention relates to real time monitoring, analysis and display of aircraft flight configuration variables

BACKGROUND OF THE INVENTION

An aircraft that is ascending following takeoff or descending on approach will have measurable kinetic energy and potential energy components, and these components will change with time in measurable manners. Desirable energy states for both takeoff and landing can be determined from aircraft manufacturer guidance for these phases of flight. For example, where the approach occurs at an airport with an operable and reliable instrument landing system (ILS), the ILS may provide data recorded on the aircraft, to serve as a standard for comparing observed kinetic and potential energy components for an aircraft near the ground, below 2500 feet altitude and for an assumed straight glide slope path to a touchdown site. If the airport has no operable and reliable ILS, or if the aircraft is not near the ground, another mechanism for providing a standard for measurements or estimates is needed. On takeoff, where no electronic guidance comparable to a guide slope sensor is available, the aircraft climb profile can be compared to manufacturer guidance or to observed performance for recorded aircraft departures from the particular airport.

The airline industry has become concerned with the problem of unstable aircraft approaches, because approach and landing accidents often begin as unstable approaches. An "unstable approach" is often defined as an approach where, below a threshold altitude (1000 feet for IFR and 500 feet for VFR), the aircraft is not established on a proper glide slope path and with a proper air speed, with a stable descent rate and engine power setting, and with a proper landing configuration (landing gear and flaps extended). Airlines have developed approach procedures that call for abandonment of an approach that is determined to be unstable.

Development and testing of methods for detecting atypical flights by N.A.S.A. has revealed that high aircraft energy during an arrival phase (below 10,000 feet but before beginning an approach) is the most common reason for a flight to be identified as atypical or out of a statistically normal range. An atypical high energy arrival phase often corresponds to aircraft kinetic energy and/or potential energy that requires dissipation of 10-30 percent more energy than is required for a normal flight arrival phase. A normal arrival phase may correspond to about a 3-1 slope guide path and decelerating to an airspeed of about 250 knots during descent through 10,000 feet altitude to a standard reference speed around 2,500 feet altitude, when an approach begins.

More than half of the high energy arrivals identified by atypicality analysis were brought under control within stabilized approach criteria; some of the remainder of the high energy arrivals were abandoned. In contrast, where these findings were used to define and search for a high-energy arrival exceedance, about three times as many excedances were detected (after touchdown); and the resulting unstable approaches were found to occur more frequently than the recoveries.

It may be possible to identify a first class of high energy arrivals where recovery and subsequent stabilization is possible and relatively easy, and to identify a second class of high energy arrivals in which recovery and subsequent stabilization is likely to be difficult or impossible. However, the present procedures for determining presence of a normal approach include an electronic glide slope that extends linearly from the end of a target runway to the aircraft, whereas a typical (normal) aircraft approach path is curved and follows the electronic glide slope only from about 1,800 feet above the field to the end of the runway.

A 3-to-1 glide path slope, corresponding to decrease of 1,000 feet in altitude for every 3 nautical miles horizontal travel, is often desirable during an arrival phase. The air speed is 250 knots or less by regulation below 10,000 feet, and the aircraft decelerates to a reference speed before joining the approach path. These parameters are directly available but are unlikely to prove to be the only relevant parameters in determining whether a flight arrival phase is normal or other than normal.

Presently, analysis of the possibility of a normal aircraft approach or other normal aircraft maneuver is provided after the fact, in an off-line comparison of the present aircraft flight parameter value(s) with a collection of corresponding reference flight parameter values that provide a "normal" aircraft maneuver. This off-line approach might be improved upon by reference to charts and tables, provided in the aircraft cabin; but the time required for such comparisons is realistically measured in minutes, and this does not allow for a real time response.

What is needed is a system for monitoring, analyzing and displaying, in real time, a present flight configuration, of an aircraft and comparison of this configuration with one or more reference flight configurations for the same or similar circumstances. Preferably, the system should include the effects of aircraft performance constraints and should indicate whether a reference flight configuration can be achieved within a selected time interval, which may vary from one flight parameter to another and from one flight phase to another.

SUMMARY OF THE INVENTION

These needs are met by the invention, which provides measurements or estimates of present flight parameter (FP) values and compares the present value(s) with corresponding reference flight parameter values for similar circumstances. For a given flight parameter and a reference (ideal) trace or reference band for that parameter, a recovery band is determined and displayed, in real time, indicating whether the present flight parameter value can recover to a reference trace or band value within a selected recovery time interval (normally 2-15 sec), including the effects of aircraft system performance constraints on the rate of recovery. The aircraft performance constraints are optionally expressed in terms of one or more constrained differential equations involving relevant time derivatives of flight parameter values. Where recovery to a reference flight parameter value is not possible within the recovery time interval, the system optionally provides one or more alternative responses for the pilot in command in order to bring subsequent flight parameter values within the recovery band RB. The recovery band can be generated and provided before the RB is used or can be generated at the time of its use.

DESCRIPTION OF BEST MODES OF THE INVENTION

Figure 1A:
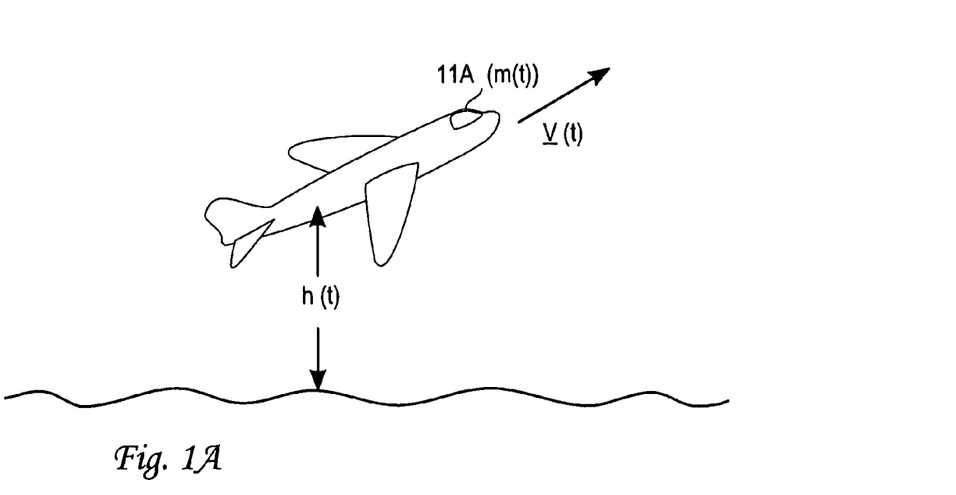
FIGS. 1A and 1B illustrates an environment in which the invention can be practiced.
Figure 1B:
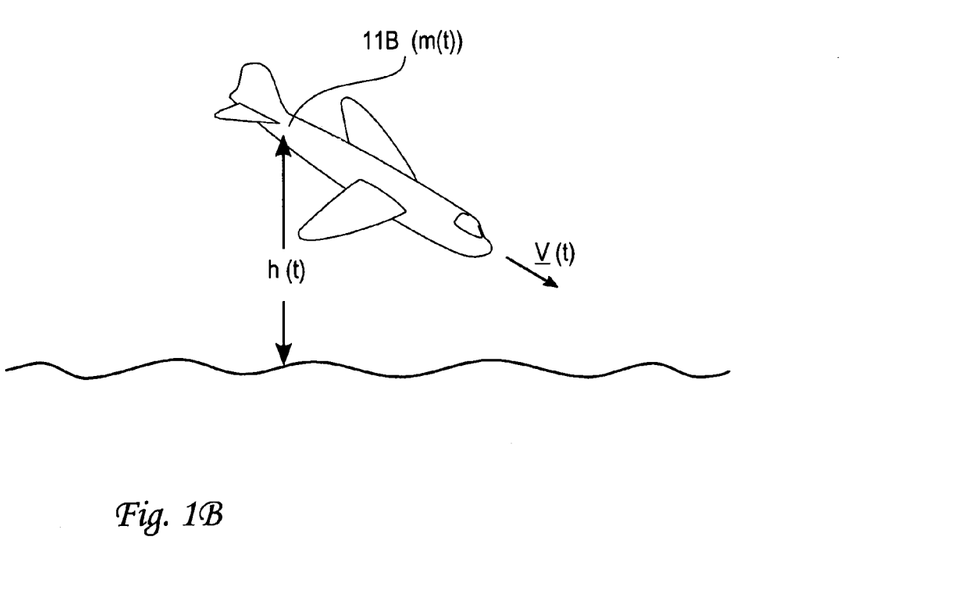

FIGS. 1A and 1B illustrate environments for an ascending aircraft (1A) and for a descending aircraft (1B) where the invention can be practiced. In FIG. 1A, an aircraft 11 is ascending, either after takeoff or in moving from a first flight altitude to a second flight altitude. In FIG. 1B, an aircraft 11 is descending, either in preparation for a subsequent touchdown or in moving from a first flight altitude to a second flight altitude. The aircraft 11 has at least one of an associated kinetic energy KE(t), potential energy PE(t), energy component $E(t)=d1 \cdot KE(t)+d2 \cdot PE(t)$, where (d1,d2) are selected non-negative real numbers; energy component time derivative $(d/dt)E(t)$, thrust power, vertical speed, ground air speed, aircraft mass, height above ground, flap position, speed brake position, landing gear position, other drag indices, roll, pitch and/or yaw angles, angle of attack, or another relevant flight parameter.

The aircraft kinetic energy and potential energy components are, respectively, $$KE(t) = m(t) \cdot v(t)^2/2 + \omega \cdot I \cdot \omega(t)/2, \quad (1)$$

$$PE(t) = m(t) \cdot g \cdot h(t), \quad (2)$$

where m(t) is the instantaneous aircraft mass (taking account of fuel consumption), I(t) is an instantaneous moment of inertia tensor for the aircraft, ω(t) is an aircraft rotation vector, computed with reference to a center of gravity or other selected location determined on the aircraft, v(t)=dx/dt is the instantaneous aircraft velocity, g is local gravity coefficient, and h(t) is the instantaneous height of aircraft cg above a local reference height, such as local ground height. The rotational component of kinetic energy may be negligible or may be ignored for other reasons. The aircraft potential energy may be taken as in Eq. (2).

An aircraft system measures or estimates or otherwise provides a value (referred to as a "measured value" for convenience herein)

$$E(t_n) = d1 \cdot KE(t_n) + d2 \cdot PE(t_n) \quad (3)$$

of an energy component of an aircraft during an ascent phase, a cruise phase or a descent phase of a flight, at each of a first sequence of times (n=1, ..., N1; N1≧2), where d1 and d2 are selected real values, not both 0; for example, the pair (d1,d2) =(1,0), (0,1), (1,1) or (1,−1). Optionally, the system also provides an energy component time derivative $$(d/dt)E(t_n) = d3 \cdot (d/dt)KE(t_n) + d4 \cdot (d/dt)PE(t_n) \quad (4)$$

where d3 and d4 are selected real values, not both 0. The system also provides a reference value $E(t'_n;ref)$ of the energy component and a reference value time derivative $(d/dt) E(t'_n; ref)$ for a time, $t=t'_n$, determined with reference to the time $t_n$ (n=1, ..., N1). The time sequence $\{t'_n\}$ may substantially coincide with the sequence $\{t_n\}$, or each time value $t'_n$ may be displaced by a calculable or measurable amount from the corresponding time value $t_n$.

Figure 2:
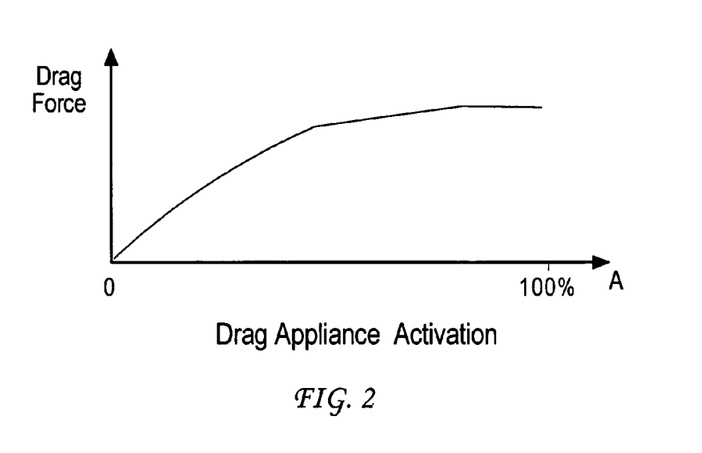
FIG. 2 graphically illustrates drag force developed versus percentage activation of an aircraft drag appliance.

Each aircraft has an associated group of drag indices, one for each activatable drag appliance (landing gear, wing flap, aileron, vertical stabilizer, horizontal stabilizer, etc.). Each drag index has a maximum value, where the drag appliance is fully activated, and has a spectrum of drag values extending from zero activation through partial activation to full activation of the appliance, as illustrated schematically in FIG. 2. With the drag appliance completely inactivated, the corresponding drag index is normally 0. The drag force associated with one drag appliance is assumed to be independent of the drag force associated with another drag appliance, in a first approximation. In an approach to touchdown, for example, where a relatively small mount of additional drag force may be required for adjustment, one or more drag appliances can be partly or fully activated to provide this additional drag force, relying on information illustrated in FIG. 2 for each drag appliance. If the amount of additional drag force needed for the adjustment is greater than the maximum cumulative drag force associated with all the activated drag appliances, the aircraft will need to use additional procedures to provide the additional drag force, or the present flight configuration should be (or should have been) terminated and reconfigured. In practice, a drag appliance is normally inactivated or fully activated, for some drag appliances (e.g., landing gear), and has a near-continuous range of settings for other drag appliances (e.g., speed brake). The sum of the drag indices for all (activated) drag appliances is determined and provided as a supplement to the drag force(s) provided by the other aircraft components (fuselage, wings, etc.)

Monitoring of thrust power developed by the engine(s) of the aircraft is straightforward and is an important control variable in change of the energy components (E(t) and (d/dt) E(t) defined in Eqs. (3) and (4). Thrust developed can be estimated using measured fuel flow rate and other relevant variables.

Roll angle, pitch angle and/or yaw angle of the aircraft can be measured or otherwise provided using one or more gyroscope mechanisms that sense present orientation relative to a reference orientation. Angle of attack of the aircraft can be measured, made available and recorded during aircraft motion.

Figure 3:
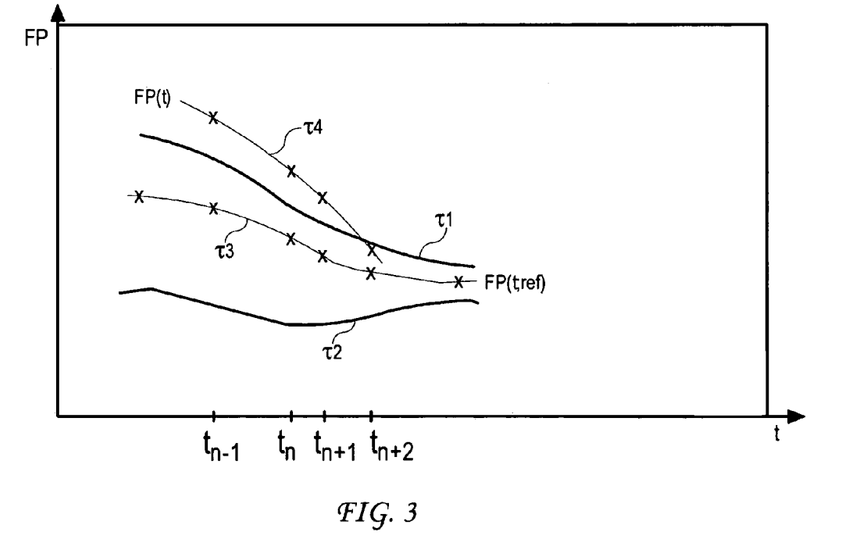
FIGS. 3 and 4 graphically illustrate a screen displaying present FP values, a trace and/or band of reference FP values, and corresponding recovery band traces determined according to the invention.

FIG. 3 is an example of a screen that facilitates practice of an embodiment of the invention for a selected flight parameter $FP(t_n)$, such as the energy component $E(t_n)=d1 \cdot KE(t_n)+d2 \cdot PE(t_n)$, the time rate of change of the energy component $(d/dt)E(t_n)$, applied thrust, a selected drag index $D(t_n)$, and roll, pitch, yaw and/or angle of attack for the aircraft body. The screen in FIG. 3 displays first and second curves, τ1 and τ2, or recovery band boundary traces $FP(t_n;RB;1$ or $2)$ representing a boundary trace or traces of a recovery band (RB), as a function of time, where each trace can be a continuous curve or can be discrete. FIG. 3 also displays a third trace τ3 (or group of traces) representing a sequence of reference values FP($t_n$;ref) within the recovery band RB; and a fourth trace τ4 representing the measured present FP values FP($t_n$), which may lie inside or outside the recovery band RB. The reference FP values trace τ3 is a sequence of FP values that correspond to a desirable aircraft flight configuration for an environment similar to the present flight. Alternatively, the trace τ3 can be replaced by a central band of reference FP values, denoted FP($t_n$;ref;CB), corresponding to a collection of desirable FP values for a given time, t=$t_n$, as illustrated in FIG. 4.

The trace τ3 in FIG. 3 refers to reference flight parameter values FP($t_n$;ref) for a reference flight, against which the corresponding present flight parameter values (trace τ4) is to be compared. It is preferable to present the RB traces, τ1 and τ2, in the physical units for that flight parameter. However, all traces can be presented in terms of dimensionless quantities with a common divisor.

The RB traces, τ1 and τ2, are defined with reference to the reference FP values FP($t_n$;ref), as discussed in the following. The RB traces, τ1 and τ2, may be, but need not be, symmetrically arranged with respect to the reference FP values. Optionally, the reference FP value trace is replaced by the central band FP($t_n$;ref;CB) and has central band boundary traces τ3; and the RB boundary traces, τ1 and τ2, can be referenced to the respective central band boundary traces, τ3A and τ3B, as illustrated in FIG. 4.

Figure 4:
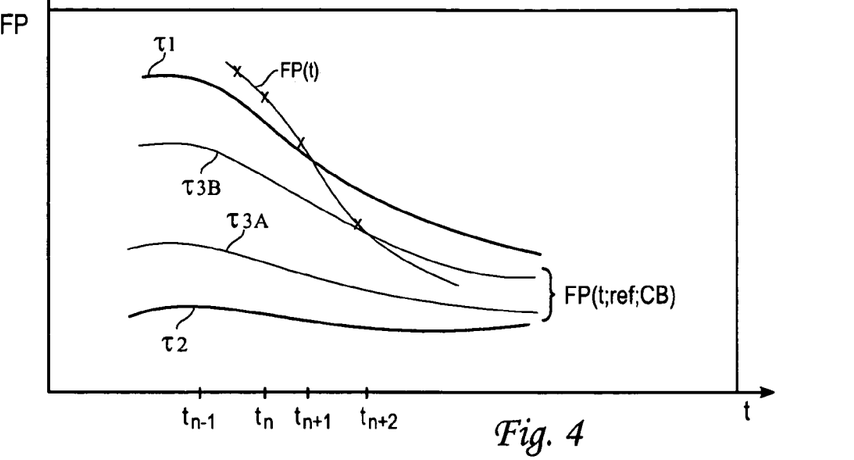

For purposes of illustration, each trace shown in FIGS. 3 and 4 is assumed to be discrete, for example, corresponding to the sequence of measurement times t=$t_n$, Optionally, the present FP values FP($t_n$) are provided (measured or estimated) in real time as the aircraft proceeds. The values FP($t_n$;ref), FP($t_n$;ref;CB;3A and 3B) and FP($t_n$;RB) are preferably determined beforehand and are available in an on-board or off-board computer.

The RB boundary traces for a particular FP are defined with reference to a recovery time interval length Δt(FP;n;rec) as illustrated in FIGS. 3 and 4 and optionally depending upon the flight parameter, the measurement time $t_n$, and other variables. For a given measurement time $t_n$ and a present FP value, FP($t_n$), that is spaced apart from the reference FP value FP($t_n$;ref), the present FP value FP($t_n$) can change at a maximum time rate of change, $\{dFP(t=t_n)/dt\}_{max}$, depending upon aircraft system constraints, so that FP($t_{n'}$) (n'>n and increasing) approaches and crosses the reference FP values trace τ3 at a time $t_{zc}(n)$ that will depend upon the values FP($t_n$) and FP($t_n$;ref), the nature of the FP itself, and any constraints imposed upon the FP and upon the FP rate of change.

Appendix 1 sets forth a determination of a present FP value, denoted u(t;$t_n$)=FP(t), as a function of time, beginning at u(t=$t_n$; $t_n$), for all constraints that can be expressed as a linear sum of zeroth, first and second time derivatives of the variable u.

$$B' \leq c2\{d^2u/dt^2\}+c1\{du/dt\}+c0 \cdot u \leq B'' \quad (5)$$

where c0, c1 and c2 are selected real numbers, at least one being non-zero, and B' and B'' are constraint values (at least one being non-zero) associated with that FP value and with that class of aircraft. An FP constraint can be represented by any reasonable expression, including but not limited to the expressions set forth in Appendix 1.

As a first example, Eq. (5) with c1=c2=0 and c0>0, corresponds to a situation in which the variable u is limited by an upper bound B'' and/or by a lower bound B', preferably with B'<0<B'', with no explicit limit on rate of change; an example of this constrained parameter value is aircraft flap angle (for drag control) or aileron angle (for control of turn radius). A second example is Eq. (5) with c0=c2=0 and c1>0, which corresponds to a limitation on time rate of change of a variable such as angle of attack. A third example is Eq. (5) with c1=0 and c0>0 and c2>0, which may correspond to a limitation on radial acceleration of u, such as turn rate for the aircraft. Appendix 1 sets forth 13 classes of "constrained solutions" u(t;$t_n$) of the constraint relations (5) for t≧$t_n$, where the initial value u(t=$t_n$;$t_n$)=FP($t_n$), the initial rate of change $\{du/dt\}_m$ and/or the initial acceleration $\{d^2u/dt^2\}_m$ is provided, where needed, in connection with Eq. (5). Alternatively, one or more constraints on aircraft performance can be set forth as individual limits on selected flight parameters Where u(t=$t_n$;$t_n$)=FP($t_n$) differs from FP($t_n$;ref), a constrained solution u(t;$t_n$) is chosen that causes the solution u(t;$t_n$) to approach FP($t_n$;ref) (preferably monotonically) for t>$t_n$:

$$\{u(t;t_n)-FP(t_n;\text{ref})\}(d/dt)\{u(t;t_n)-FP(t_n;\text{ref})\}<0. \quad (6)$$

The quantity $$\Delta u(t_n)=u(t_n;t_n)-FP(t_n;\text{ref}), \quad (7)$$

with n'>n and increasing, is analyzed, and a first zero-crossing value, t=$t_{zc}(n)>t_n$ is estimated for which Δu(t=$t_{zc}(n)$)=0. Determination of the zero crossing time $t_{zc}(n)$ is straightforward, because FP($t_n$;ref) is known or specified and u(t;$t_n$) (for t≧$t_n$) is determinable from the results in Appendix 1 or other relevant constraint expressions. The system then determines if a specified recovery time interval length Δt(FP;rec) (dependent upon the present phase of the flight) satisfies $$\Delta t1(t_n)=\{t_{zc}(n)-t_n\}-\Delta t(FP;\text{rec})\leq 0. \quad (8)$$

The recovery time interval length may vary with the particular choice of FP and with the phase of the flight, but often lies in a range 2-15 sec. If the inequality in Eq. (8) is satisfied, the initial value u(t;$t_n$)=FP($t_n$) lies within the recovery band RB, and the present FP value can recover to a subsequent reference FP value FP($t_{n'}$;ref) (n'>n) within the recovery time interval. If the inequality in Eq. (8) is not satisfied, the initial value u(t=$t_n$;$t_n$)=FP($t_n$) does not lie within the recovery band RB, and additional time is likely required for recovery. The algebraically largest (or smallest) constraint equation solution initial value, u(t;upper) or u(t;lower) for t=$t_n$, for which the inequality in Eq. (8) is satisfied determines one value u0(t=$t_n$;$t_n$) on the recovery band boundary RB (trace τ1 or τ2). The locus of all points on one or the other of the boundary traces τ1 or τ2 defines that recovery band boundary (RBB) trace.

Determination of Recovery Band Boundaries

As noted in Appendix 1, to determine the coordinates of a point on the recovery band boundary (RBB), it is more convenient and straightforward to begin at the coordinates (t,u(t)) of a point on the FP reference curve FP(t;ref) and to proceed backward in time, using a modified time variable τ, such as $$\tau=t_{zc}(n)+t_n-t, \quad (9)$$

to determine a boundary point on the RBB. Beginning at a point on a flight parameter graph with initial coordinates $$(t,u(t))=(t_{zc}(n), FP(t_{zc}(n);\text{ref})) \quad (10)$$

on the FP reference curve, a constrained solution is run in reverse to a point having final coordinates $$(t,u(t))=(t_{zc}(n)-\Delta t(FP;\text{rec}), u(t_{zc}(n)\Delta t(FP;\text{rec}))), \quad (11)$$

which is identified as a point on the recovery band boundary RBB. This process is repeated for a sequence of initial coordinates ($t_{zc}(n)$, $FP(t_{zc}(n);ref)$ on the reference curve, preferably (but not necessarily) for an "initial" temporal value $$t = t_{zc}(n), \quad (12)$$

corresponding to an initial time $t = t_n$ for a constrained solution $u(t;t_n)$. That is to say, the choice for the value $t_{zc}(n)$ may be arbitrary but preferably corresponds to one of the sequence of the measurement values, $t = t_n$, for the FP.

Figure 5A:
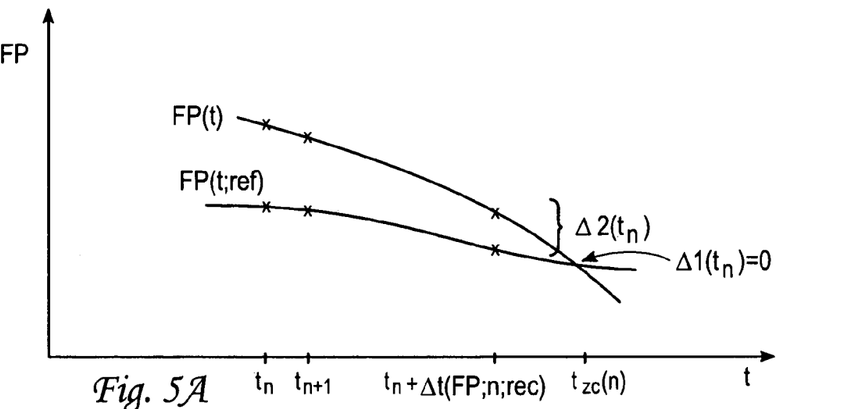
FIGS. 5A/5B graphically illustrate recovery band boundary trace determination for a reference trace and a reference band.

A recovery band boundary trace is thus expressible as a sequence of coordinate pairs $\{(t_{zc}(n) - \Delta t(FP;rec), u(t_{zc}(n) - \Delta t(FP;rec))\}$, where the time value $t_{zc}(n)$ is arbitrary. The choice of the temporal value $t_{zc}(n)$ determines coordinates $(t = t_{zc}(n) - \Delta t(FP;rec), u(t = t_{zc}(n) - \Delta t(FP;rec)'t_n))$ of the RBB point corresponding to that point on the FP reference curve. As noted above, the upper and lower RBB traces, $\tau 1$ and $\tau 2$, are not necessarily symmetrically arranged relative to the reference trace $FP(t_n;ref))\}$ so that these two traces may need to be determined separately. FIG 5A illustrates this procedure where a single FP reference trace $FP(t;ref)$ is used.

Figure 5B:
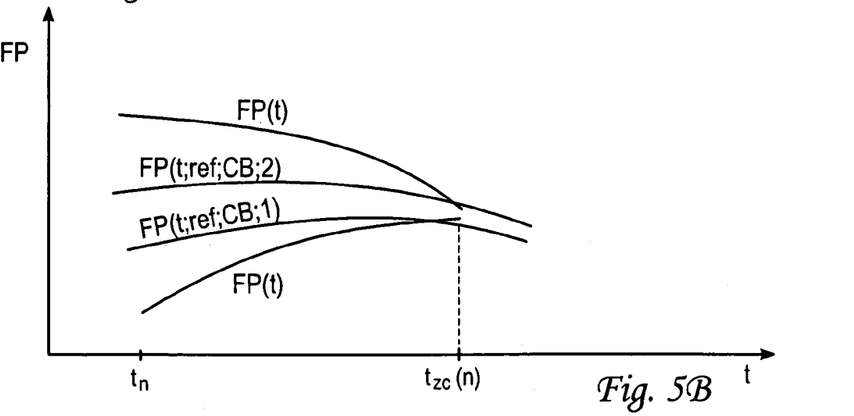

FIG. 5B illustrates use of a reference band $FP(t_n;ref;CB)$ with upper and lower boundaries, rather than a reference trace $FP(t_n;ref;CB)$ to determine the recovery band boundaries. The upper trace RBB(U) or lower trace RBB(L) of the RBB is determined only with reference to the upper RBB or lower RBB, respectively, as indicated in FIG. 5B.

Figure 6:
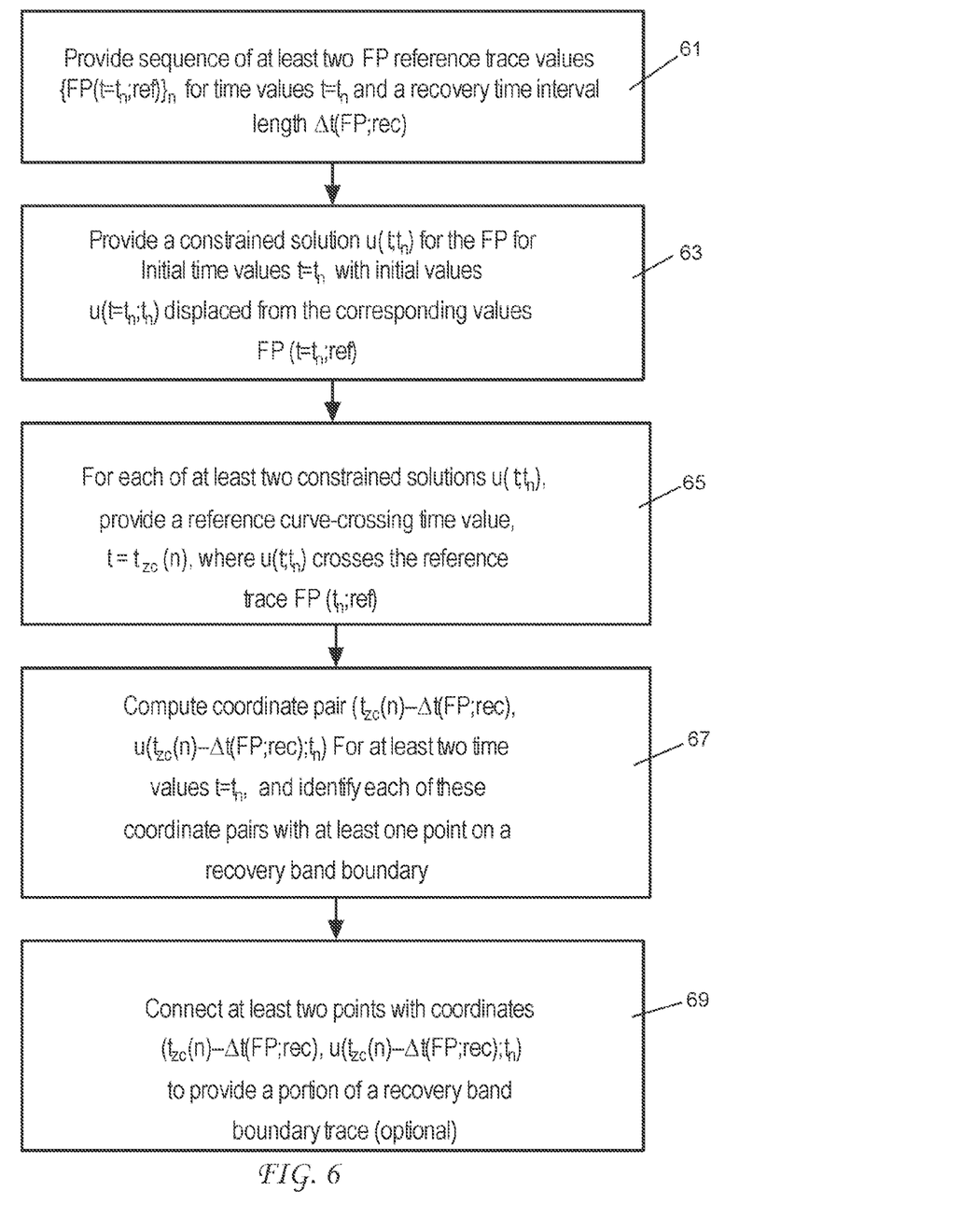
FIGS. 6 and 7 are flow charts of procedures for practicing the invention.

FIG. 6 is a flow chart of a procedure for determining an upper (or lower) RBB, which can be determined before a flight or during a flight. In step 61, a sequence of two or more FP reference values $FP(t_n;ref)$ is provided, with corresponding temporal values, $t = t_n$ (n=n1, n2), and a recovery time interval length $\Delta t(FP;rec)$ is provided, for a selected flight parameter FP. In step 62, a constrained solution $u(t;t_n)$ for the FP is determined or otherwise provided for a sequence of two or more initial temporal values, $t = t_{n'}$, having at least one initial value, $u(t = t_{n'};t_{n'})$ that is displaced from a corresponding reference value $FP(t_{n'};ref)$, either through the considerations in Appendix 1 or by another suitable prescription of constraint (s) on the FP. In step 63, a corresponding reference curve-crossing time value, $t = t_{zc}(n)$, is determined where the constrained solution $u(t;t_n)$ crosses a reference curve $FP(t;ref)$, or crosses a selected boundary trace of a reference band $FP(t;ref;CB)$, for each of at least two of the sequence of constrained solutions $u(t;t_n)$. In step 64, beginning with a point on the reference curve or reference band boundary trace with coordinates $(t_{zc}(n) u(t_{zc}(n);t_n))$, the system computes the coordinate pair $(t_{zc}(n) - \Delta t(FP;rec), u(t_{zc}(n) - \Delta t(FP;rec);t_n))$ for at least two time values, $t = t_n$ (n=n1, n2), and identifies this coordinate pair with a point on the recovery band boundary. This may be repeated for each constrained solution $\{u(t;t_n)\}_n$ in the sequence to determine a segment of the RBB in step 65 (optional).

Where the reference FP values $FP(t_m;ref)$ are replaced by a central band of values $FP(t_m;ref;CB)$, the quantity $FP(t_m;ref)$ in steps 61, 62 and 63 is replaced by an upper reference band boundary trace $FP(t;ref;CB;3A)$ or by a lower reference band boundary trace $FP(t;ref;CB;3B)$ for the central band in the flow chart in FIG. 6, and the invention can be applied to a central band $FP(t;ref;CB)$ as well as to a single reference trace $FP(t;ref)$.

This procedure is preferably implemented beforehand and provided as part of a software package in a computer (onboard or offboard) that is used on a flight. However, this procedure may also be implemented during the flight, in real time or near real time. This procedure would be implemented separately for each flight parameter FP of interest, and each FP will have its own characteristic constraint solutions, which may vary with the phase of the flight, with the initial value $u(t=t_n;t_n)$, and with the local environment (origin airport, waypoint, destination airport, etc.).

Use of the Recovery Band

Figure 7:
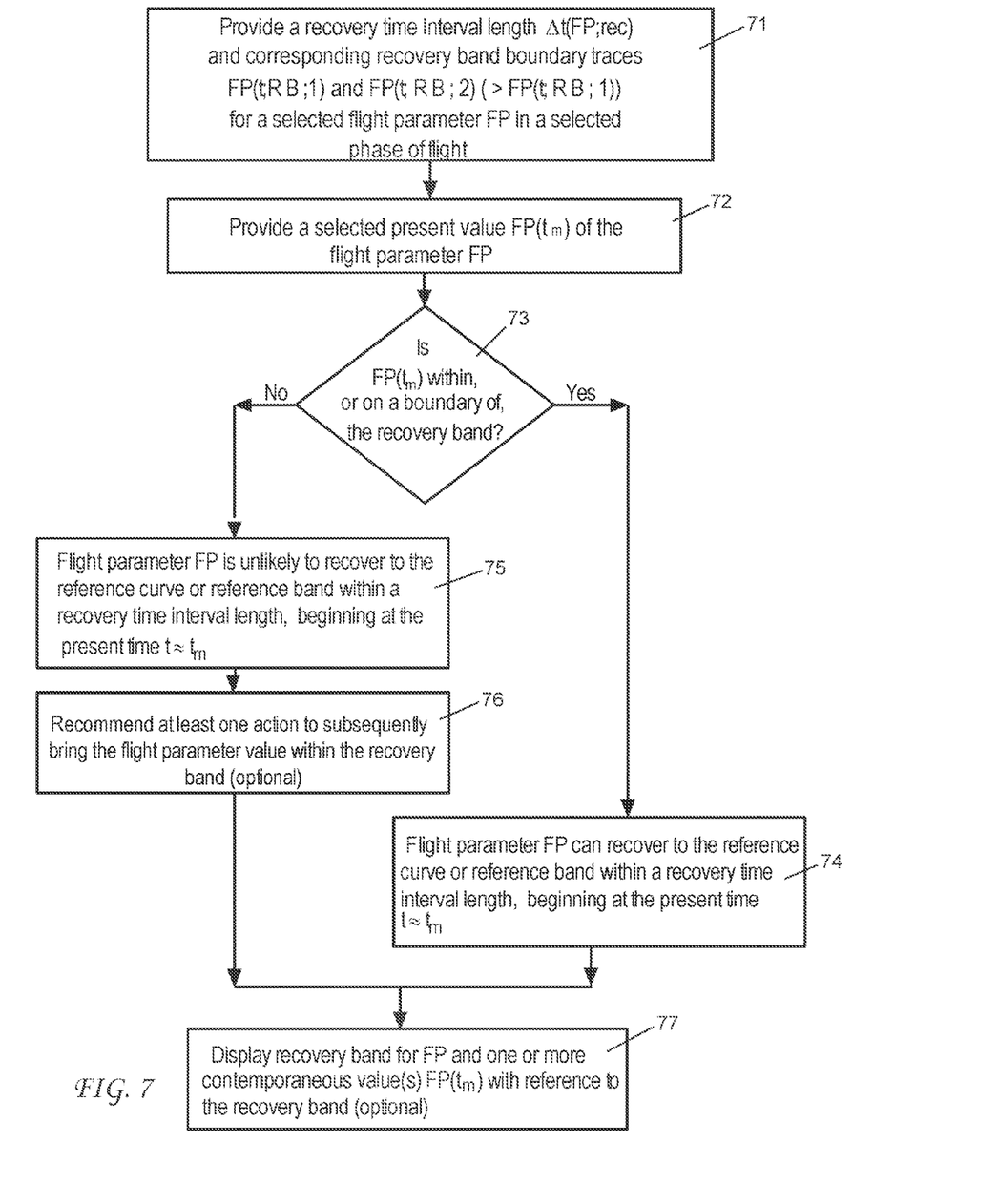

When the recovery band and its boundaries (for a given phase and a given flight parameter FP) have been determined or otherwise provided, an aircraft in flight or proceeding toward take off may use the RB, as indicated in a flow chart in FIG. 7, to determine if recovery to a reference curve or reference band is possible. In step 71, a recovery time interval length $\Delta t(FP;rec)$ and corresponding recovery band boundary traces $FP(t;RB;1)$ and/or $FP(t;RB;2)$ are determined or otherwise provided, for a selected flight parameter FP and for an appropriate present phase of a flight. In step 72, a present flight parameter value $FP(t_m)$ of the flight parameter FP is provided. In step 73, the system determines if $FP(t_m)$ is within or on a boundary of the recovery band, for example, $$FP(t_n;RB;1) \leq FP(t_m) \leq FP(t_n;RB;2)). \quad (13)$$

If the answer to the query in step 73 is "yes," the system interprets this condition as indicating that the flight parameter FP can (or is likely to be able to) recover to the reference curve or reference band within a recovery time interval length, beginning at the present time, $t \approx t_m$, in step 74. If the answer to the query in step 73 is "no," the system interprets this condition as indicating that the flight parameter FP is unlikely to be able to recover to the reference curve or reference band within a recovery time interval length, beginning at the present time, $t \approx t_m$, in step 75. In step 76, the system optionally recommends at least one action to subsequently bring the flight parameter value within the recovery band. The system then proceeds to step 77 (optional) and displays a selected section of the recovery band and one or more contemporaneous value(s) $FP(t_m)$, with reference to the recovery band. The procedures in the flow charts in FIGS. 6 and 7 can be performed together.

This procedure is implemented din real time, or near-real time, as the flight progresses. Where recovery of K flight parameter values $FP_k(t_m)$ (k=1, . . . , K; K≧2) is a concern, each flight parameter will have its own recovery time interval length $\Delta t(FP_k;rec)$ and its own recovery band boundary traces, $FP_k(t;RB;1)$ and $FP_k(t;RB;2)$; and joint recovery of the K flight parameters should be examined with reference to the K recovery bands.

In order to generate a continuous trace of a reference curve or reference band boundary, such as $FP(t;ref)$ or $FP(t;ref;CB;1$ or $2)$, or a continuous trace of a recovery band boundary, such as $FP(t;RB;1$ or $2)$, one may need to extend the underlying definition of the reference or recovery function from discrete points to a continuum (here, of temporal values t). Given N function values $f(t_n)$ (n=1, 2, . . . , N; N≧2), with $t_1 < t_2 < \ldots < t_N$ for definiteness, the estimation function N N
$$F(t;est) = \Sigma f(t_m) \pi \{(t-t_n)/(t_m-t_n)\} \quad (14)$$
m=1 n=1, n≠m is continuous in the range $t_1 \geq t \geq t_N$ and beyond and satisfies $$F(t=t_k;est) = f(t_k). \quad (15)$$

Because the measurement times are spaced apart, none of the denominators in $F(t;est)$ is 0, and the magnitude of $F(t;est)$ is bounded. The definition for $F(t;est)$ can be extended to any finite number N of time points.

More generally, one can define an estimation function $F*(t;est)$ as a sum of two or more continuous characteristic functions $F^*(t;k)$ ($k=1, \ldots, N$; $N \geq 2$), where the characteristic function component $F^*(t;k)$ satisfies $$F^*(t=t_p;k) = f(t_k) \ (p=k) = 0 \ (p \neq k). \tag{16}$$

APPENDIX 1

Some Constraint Equations for Aircraft Performance

Constraints on aircraft performance can arise from limitations in engine, airfoil and system performance, limitations imposed by an airline on its own flights, limitations imposed by a regulatory agency (such as the F.A.A. or the N.T.S.B.), and other limitations. For purposes of this analysis, a constraint on a flight parameter FP is assumed to be expressible in terms of zeroth, first and second order linear differential equations in a constrained solution $u(t;t_n)$ for the flight parameter FP:

$$B' \leq c2(d^2u/dt^2) + c1(du/dt) + c0 \cdot u \leq B'', \tag{A-1}$$

$$u(t=t_n;t_n) = u0(t_n) = FP(t_n), \tag{A-2a}$$

$$(d/dt)u(t=t_n;t_n) = u'0(t_n) \text{ (optional; dependent on } t_n\text{)}, \tag{A-2b}$$

$$(d^2/dt^2)u(t=t_n;t_n) = u''0(t_n) \text{ (optional; dependent on } t_n\text{)}, \tag{A-2c}$$

where $c2$, $c1$ and $c0$ are selected real numbers, at least one of which is non-zero, $B0$ and $B1$ are selected real numbers. 12 classes of constraint equation solutions are analyzed here, depending upon which of the coefficients $c2$, $c1$ and $c0$ are non-zero. For most relevant constraints (A-1), $B0 < 0 < B1$.

Figure 8:
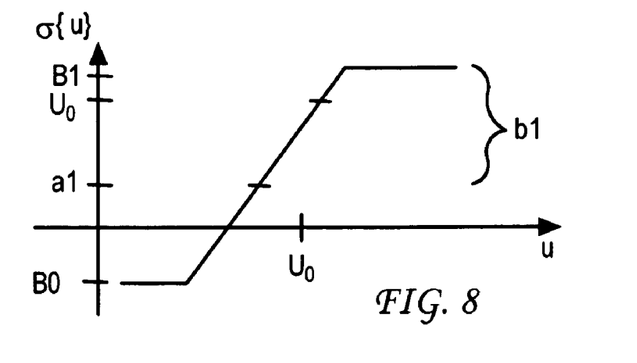
FIGS. 8-16 graphically illustrate examples of constrained FP values u and the applicable constraints for various constraint classes.

Class 1: $c1 = c2 = 0$; $c0 \neq 0$. This class includes limitations on an aircraft flap angle (or drag control) or an aileron angle (for aircraft turn radius). Without loss of generality, the coefficient $c0$ is assumed to have the value +1. The quantity $u$ is constrained by $$B0 \geq u(t) \geq B1, \tag{A-3a}$$

$$B0 \geq u(t=t_n;t_n) = u0 \leq B1, \tag{A-3b}$$

is equal to u between B0 and B1, is limited at the lower end by the value B0 and is limited at the upper end by the value B1 ($\geq$B0), as illustrated in FIG. 8. The constraints in Eq. (A-3) are implemented analytically by the functional and constraint solution $$u \rightarrow \alpha\{u;a1;b1\} = a1 + \{|u(t;t_n) + b1| - |u(t;t_n) - b1|\}/2 \tag{A-4a}$$

$$a1 = (B0 + B1)/2, \tag{A-4b}$$

$$b1 = (B1 - B0)/2, \tag{A-4c}$$

together with any other relevant initial conditions for $u(t;t_n)$ and its derivatives. Optionally, one of the constraints can be deleted, by formally setting $B0 = -\infty$ or $B1 = +\infty$. The left hand constraint and right hand constraint in Eq. (A-3a) would be applied when the quantity u is to be driven toward smaller values and toward larger values, respectively.

Figure 9:
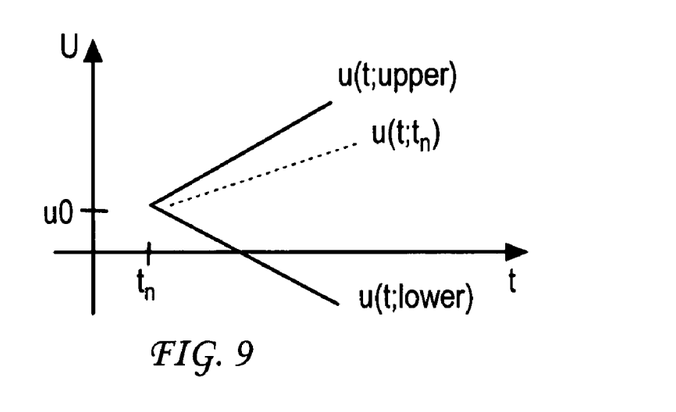

Class 2; $c0 = c2 = 0$; $c1 \neq 0$. This class includes a limitation on rate of change of angle of attack or rate of change of vertical or horizontal stabilizer angle. Without loss of generality, the coefficient $c1$ is assumed to have the value +1. FIG. 8, with u replaced by $du/dt$, illustrates the affect of this constraint on the variable $du/dt$. The constrained solution u satisfies.

$$u(t;\text{lower}) = B0\Delta t + u0 \leq u(t;t_n) = u'0(\Delta t) + u0 \leq B1\Delta t + u0 = u(t;\text{upper}), \tag{A-5a}$$

$$B0 \geq u'0 \geq B1, \tag{A-5b}$$

$$\Delta t = t - t_n (\geq 0), \tag{A-5c}$$

with u0 unconstrained. FIG. 9 illustrates the upper limit and lower limit solutions, u(t;upper) and u(t;lower), and a permissible constrained solution u(t), corresponding to Eqs. (A-5). Optionally, one of the constraints can be deleted. The constrained solution $u(t;t_n)$ for $t \geq t_n$ can be implemented and analytically using the functional $$u \rightarrow \alpha\{u;a2;b2\} \tag{A-6a}$$

$$a2(t) = (B0 + B1)(\Delta t)/2 + u0, \tag{A-6b}$$

$$b2(t) = (B1 - B0)(\Delta t)/2 + u0, \tag{A-6c}$$

$$u(t;\text{lower}) = B0(\Delta t) + u0 \geq u(t;t_n) = u'0 \cdot (\Delta t) + u0 \leq B1(\Delta t) + u0 = u(t;\text{upper}), \tag{A-6d}$$

The constraints set froth in Eq. (A-6d) correspond to Eq. (A-1).

Class 3: $c0 = c1 = 0$,; $c2 \neq 0$. This class includes a limitation on second order rate of change of the flight parameter value, with $u0$ and $u'0$ unconstrained. Without loss of generality, the coefficient $c2$ is assumed to have the value +1. The functional and constraint solution for this class are given by $$B0 \leq u''0 \leq B1, \tag{A-7}$$

$$u \rightarrow \alpha\{u;a3;b3\}, \tag{A-8a}$$

$$a3(t) = (B0 + B1) \cdot (\Delta t)^2/4 + u'0 \cdot (\Delta t) + u0, \tag{A-8b}$$

$$b3(t) = (B1 - B0) \cdot (\Delta t)^2/4, \tag{A-8c}$$

$$u(t;\text{lower}) = B0 \cdot (\Delta t)^2/2 + u'0(\Delta t) + u0 \leq u(t;t_n) = u''0 \cdot (\Delta t)^2/2 + u'0(\Delta t) + u0 \leq B1 \cdot (\Delta t)^2/2 + u1 \cdot (\Delta t) + u0 = u(t;\text{upper}). \tag{A-8d}$$

Figure 10:
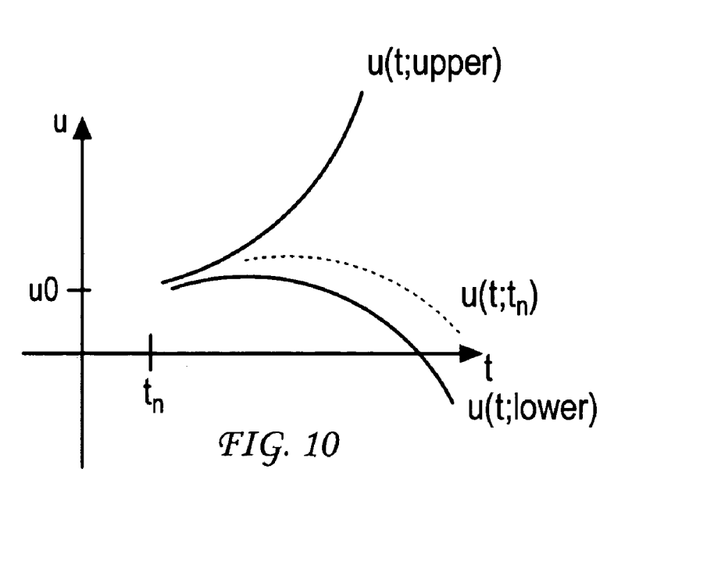

The upper branch and lower limit solutions and a permissible constrained solution $u(t;t_n)$ are illustrated in FIG. 10.

Class 4: $c0 \neq 0$, $c1 \neq 0$, $c2 = 0$, $c0/c1 = a$ ($\neq 0$). This class includes a combined limitation of a sum of the zeroth and first derivatives. The constraints are expressed as $$B0 \leq du/dt + au \leq B1, \tag{A-9}$$

and the function and constraint solution of this class are given by $$u \rightarrow \alpha\{u;a4;b4\}, \tag{A-10a}$$

$$a4(t) = ((B1+B0)/2a)\{1-\exp(-a\Delta t)\} + u0 \cdot \exp(\{-a\Delta t) \tag{A-10b}$$

$$b4(t) = ((B1-B0)/2a)\{1-\exp(-a\Delta t)\} \tag{A-10c}$$

$$u(t;\text{lower}) = (B0/a)\{1-\exp(-a\Delta t) + u0 \cdot \exp\{-a\Delta t)\} \leq u(t;t_n) = (u'0/a)\{1-\exp(-a\Delta t) + u0 \cdot \exp\{-a\Delta t)\} \leq (B1/a)\{1-\exp(-a\Delta t) + u0 \cdot \exp\{-a\Delta t) = u(t;\text{upper}). \tag{A-10d}$$

Figure 11:
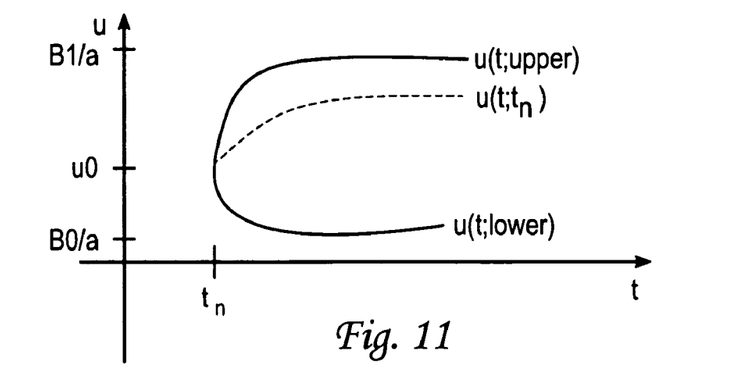

Here, $u0$ and $u'0$ are constrained by Eq. (A-9). The upper branch and lower limit solutions and a permissible constrained solution $u(t;t_n)$ are illustrated in FIG. 11.

Class 5: $c0 = 0$, $c1 \neq 0$, $c2 \neq 0$, $c1/c2 = a (\neq 0)$. The constraints are expressed as $$a^2 B0 \leq d^2u/dt^2 + a(du/dt) \leq a^2 B1. \tag{A-11a}$$

The constraint relation (A-11a) can be re-expressed as $$a^2 B0 < \exp(-a\Delta t) \ (d/dt)\{\exp(at)(du/dt)\} \leq a^2 B1, \tag{A-11b}$$

which has a constrained solution expressible as $B0\{a\Delta t-(1-\exp(-a\Delta t)\}+au'0\{1-\exp(-a\Delta t)\}+u0\exp(-a\Delta t)=u(t;\text{lower})\leq u(t;t_n)\leq B1\{a\Delta t-(1-\exp(-a\Delta t)\}+au'0\{1-\exp(-a\Delta t)\}=u(t;\text{upper}).$ (A-12a).

The functional and constraint solution for this class are given by $u\to\alpha\{u;a5;b5\},$ (A-12b)

$a5(t)=(B0+B1)\{a\Delta t-(1-\exp(-a\Delta t)\}/2+au'0\{1-\exp(-a\Delta t)\},$ (A-12c)

$b5(t)=(B1-B0)\{a\Delta t-(1-\exp(-a\Delta t))\}/2.$ (A-12d)

Figure 12:
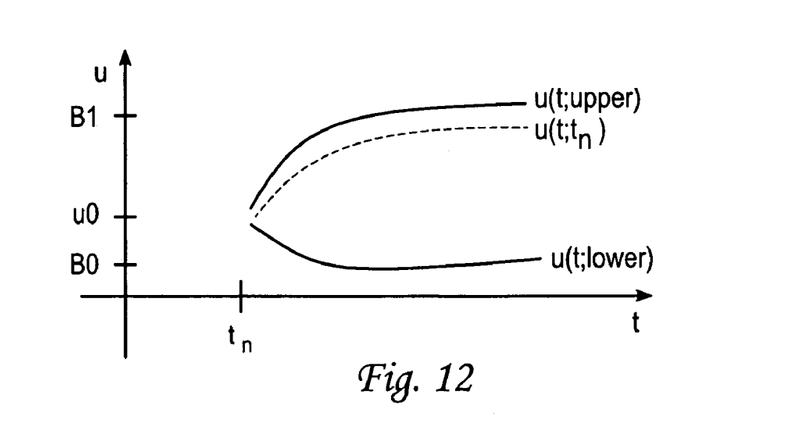

Here, u0 and u'0 are constrained by Eq. (A-12a)). The upper branch and lower limit solutions and a permissible constrained solution $u(t;t_n)$ are illustrated in FIG. 12.

Class 6: $c0\neq 0$, $c1=0$, $c2\neq 0$, $c0/c2=\epsilon^2 a^2$. ($\epsilon^2=\pm 1$) For $\epsilon^2=-1$, the constrains and initial conditions are written $a^2 B0\leq d^2 u/dt^2 - a^2 u\leq a^2 B1.$ (A-13a)

$u(t=t_n;t_n)=u0,$ (A-13b)

$(d/dt)u(t=t_n;t_n)=u'0.$ (A-13c)

The left hand inequality in Eq. (A-11a) (B0 only) is re-expressed as $a^2 B0\leq \exp(a\Delta t)(d/dt)\{\exp(-2a\Delta t)(d/dt)(\exp(a\Delta t)u)\}$ (A-14a)

$\Delta t=t-t_n (\geq 0).$ (A-14b)

Equation (A-14a) can be temporally integrated once to provide $a B0\{1-\exp(-a\Delta t)\}\exp(2a\Delta t)+u'0+a u0\}\exp(2a\Delta t)\leq (d/dt)\{u\exp(a\Delta t)\},$ (A-15a)

which can be temporally integrated a second time to provide $(B0/2)\{\exp(a\Delta t)-\exp(-a\Delta t)\}+(2B0+u0+u'0/a)\{\exp(a\Delta t)-\exp(-a\Delta t)/2\}+u0\exp(-a\Delta t)=u(t;\text{lower})\leq u(t;t_n)\leq (B1/2)\{\exp(a\Delta t)-\exp(-a\Delta t)+(2B1+u0+u'0/a)\{\exp(a\Delta t)-\exp(-a\Delta t)\}/2+u0\exp(-a\Delta t),=u(t;\text{upper}),$ (A-15b)

where the right hand inequality in Eq. (A-13a) is included by symmetry arguments. The constrained solution $u(t;t_n)$ in Eq. (A-15b) can be implemented using the functional $u\to\alpha\{u;a6;b6\},$ (A-16a)

$a6(t)=((B0+B1)/4)\{\exp(a\Delta t)-\exp(-a\Delta t)+((B0+B1)/2)\{1-\exp(-at)\}+(u'0+a\,u0)\{\exp(a\Delta t)-\exp(-a\Delta t)\}+u0\exp(-a\Delta t)$ (A-16b)

$b6(t)=((B1-B0)/4)\{\exp(a\Delta t)-\exp(-a\Delta t)+((B1-B0)/2)\{1-\exp(-at)\}$ (A-16c)

Figure 13:
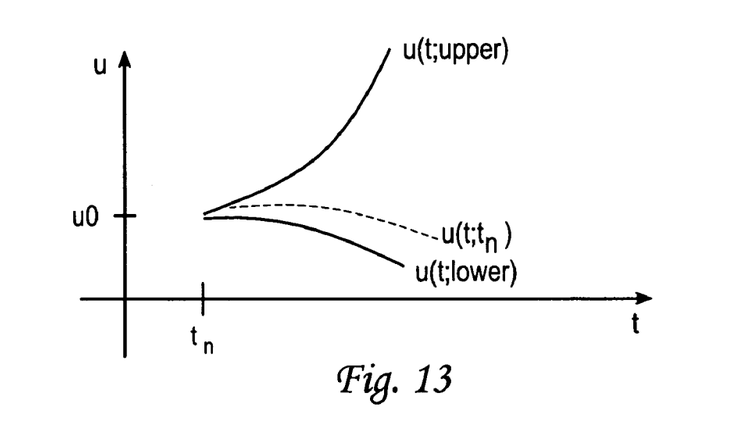

Here, u0 and u'0 are constrained in accord with Eq. (A-15b). The upper branch and lower limit solutions and a permissible constrained solution u(t) are illustrated in FIG. 13.

Class 7: $c0\neq 0$, $c1=0$, $c2\neq 0$, $c0/c2=\epsilon^2 a^2$.($\epsilon^2=\pm 1$) For $\epsilon^2=+1$, the constraints and initial conditions are written $a^2 B0\leq d^2 u/dt^2+\epsilon^2 a^2 u\leq a^2 B1.$ (A-17a)

$u(t=t_n;t_n)=u0,$ (A-17b)

$(d/dt)u(t=t_n)=u'0,$ (A-17c)

The lower and upper solutions, the constrained solution, the functional $\alpha\{u;a7;b7\}$ and the functional parameters, a7 and b7, are determined by replacing the parameter a by +ia or by $-ia$ ($i^2=-1$) in Eqs. (A-15b), (A-16a), (A-16b) and (A-16c).

$\{(B0/2)+(u'0+a\,u0)\}\{\exp(ia\Delta t)-\exp(-ia\Delta t)\}+u0\exp(-ia\Delta t)=u(t;\text{lower})\leq u(t;t_n)\leq \{(B1/2)+(u'0+a\,u0)\}\{\exp(ia\Delta t)-\exp(-ia\Delta t)\}+u0\exp(-ia\Delta t=u(t;\text{upper}),$ (A-18a)

$u\to\alpha\{u;a7;b7\},$ (A-18b)

$a7(t)=((B0+B1)/4)\{\exp(ia\Delta t)-\exp(-ia\Delta t)\}+(u'0+a\,u0)\{\exp(a\Delta t)-\exp(-a\Delta t)\}+u0\exp(-a\Delta t)$ (A-18c)

$b7(t)=((B1-B0)/2)\{\exp(ia\Delta t)-\exp(-ia\Delta t)\},$ (A-18d)

Figure 14:
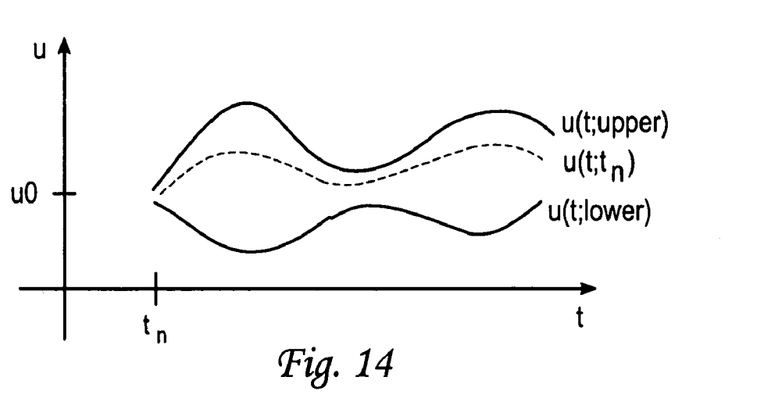

Here, u0 and u'0 are constrained in accord with Eq. (A-17a). The upper branch and lower limit solutions and a permissible constrained solution $u(t;t_n)$ are illustrated in FIG. 14.

Class 8: $c1/c2=2a\neq 0$, $c0/c2=\chi a^2 (\chi\neq+1)$. The defining equation becomes $B0 a^2\leq d^2 u/dt^2+2a(du/dt)+\chi a^2 u\leq B1 a^2.$ (A-19a)

Define $-a1=\pm 2\sqrt{\{(1-\chi^2)a^2\}},$ (A-19b)

$a2=a\pm\sqrt{\{(1-\chi^2)a^2\}},$ (A-19c)

which are components of the roots of the quadratic equation $A^2+2aA+\chi a^2=0,$ (A-20a)

$A=a\{-1\pm\sqrt{(1-c)}\}.$ (A-20b)

The left hand side of the defining equation (A-16) is re-expressed as $B0 a^2\leq\exp\{(-(a1+a2)\Delta t\}(d/dt)\{\exp(a1\Delta t)(d/dt)\{\exp(a2\Delta t)u\}\}$ (A-21)

Equation (21) can be temporally integrated once to yield $\{a^2 B0/(a1+a2)\}\{\exp\{(a1+a2)\Delta t\}-1\}\leq\exp(a1\Delta t)(d/dt)\{\exp(a2\Delta t)u\}-u'0+a2\,u0$ (A-22a)

Equation (A-22a) can be temporally integrated a second time to yield $\{a^2 B0/(a1+a2)\}\{(1-\exp(-a2\Delta t))/a2-(\exp(-(a2\Delta t)-\exp(-(a1+a2)\Delta t))/a1\}+(u'0+a2\,u0)(\exp(-a2\Delta t)-\exp(-(a1+a2)\Delta t)/a1+u0=u(t;\text{lower})\leq u(t;t_n)\leq\{a^2 B1/(a1+a2)\}\{(1-\exp(-a2\Delta t)/a2-(\exp(-(a2\Delta t)-\exp(-(a1+a2)\Delta t))/a1\}+(u'0+a2\,u0)(\exp(-a2\Delta t)-\exp(-(a1+a2)\Delta t)/a1+u0=u(t;\text{upper}),$ (A-22b)

where the right hand inequality in Eq. (A-22b) is included by symmetry arguments. The constrained solution $u(t;t_n)$ in Eq. (A-22b)) can be implemented using the functional $u\to\alpha\{u;a8;b8\},$ (A-23a)

$a8(t)=\{a^2(B0+B1)/2(a1+a2)\}\{1-\exp(-a2\Delta t))/a2-(\exp(-(a2\Delta t)-\exp(-(a1+a2)\Delta t))/a1\}+(u'0+a2\,u0)(\exp(-a2\Delta t)-\exp(-(a1+a2)\Delta t)/a1+u0$ (A-23b)

$b8(t)=(a^2(B1-B0)/2(a1+a2)\}\{(1-\exp(-a2\Delta t))/a2-(\exp(-(a2\Delta t)-\exp(-(a1+a2)\Delta t))/a1\}.$ (A-23c)

Figure 15:
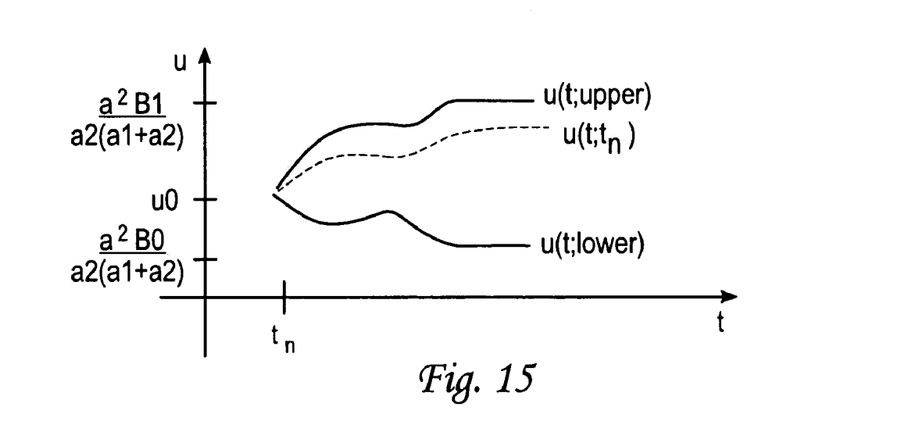

Here, u0 and u'0 are constrained in accord with Eq. (A-18a). The upper branch and lower limit solutions and a permissible constrained solution $u(t;t_n)$ are illustrated in FIG. 15.

Class 9: $c1/c2=2a\neq 0$, $c0/c2=\chi a^2 (\chi=+1)$. The defining equation becomes $B0 a^2\leq d^2 u/dt^2 2a(du/dt)+a^2 u=L[u]\leq B1 a^2,$ (A-24)

which has a degenerate solution $u=\exp(-a\Delta t)$ (a double root of $L[u]=0$). Assume that a second, independent solution of $L[u]=0$ has the form $$u(t;t_n)=w(t;t_n)\exp(-a\Delta t). \quad \text{(A-25)}$$

The solution component w(t) is found to satisfy $$d^2w/dt_2=0, \quad \text{(A-26a)}$$

$$w(t;t_n)=w0+w'0\Delta t \quad \text{(A-26b)}$$

The constraints in Eq. (24) can be re-expressed as $$B0\{\{1-\exp(-a\Delta t)\}-a\Delta t\exp(-a\Delta t)\}+(w0+w'0\Delta t)\exp(-a\Delta t)=u(t;\text{lower})\leq u(t;t_n)\leq B1\{\{1-\exp(-a\Delta t)\}-a\Delta t\exp(-a\Delta t)\}+(w0+w'0\Delta t)\exp(-a\Delta t)=u(t;\text{upper}) \quad \text{(A-27)}$$

The constrained solution $u(t;t_n)$ in Eq. (A-27)) can be implemented using the functional $$u\to\alpha\{u;a8;b8\}, \quad \text{(A-28a)}$$

$$a9(t)=(B0+B1)\{\{1-\exp(-a\Delta t)\}-a\Delta t\exp(-a\Delta t)\}/2+(w0+w'0\Delta t)\exp(-a\Delta t), b9(t)=(B1-B0)\{\{1-\exp(-a\Delta t)\}-a\Delta t\exp(-a\Delta t)\}/2. \quad \text{(A-28c)}$$

Figure 16:
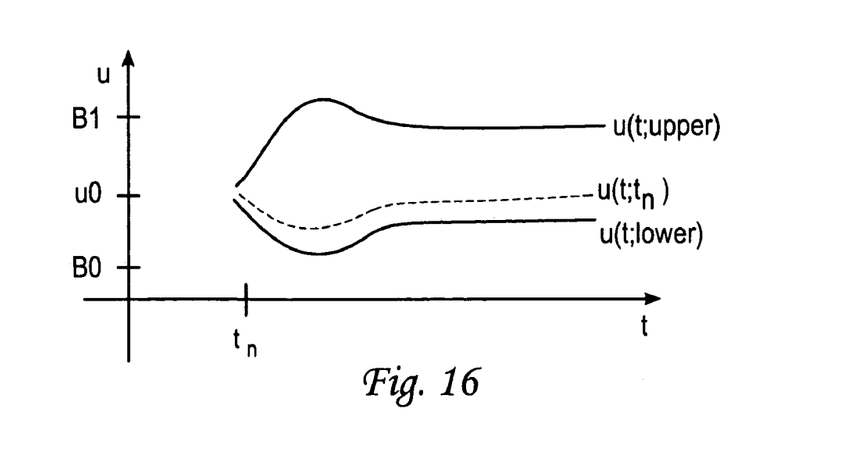

Here, w0 and w'0 are constrained in accord with Eq. (A-27). The upper branch and lower limit solutions and a permissible constrained solution $u(t;t_n)$ are illustrated in FIG. 16.

Class 10: $B0\leq u\leq B1$ and $B2\leq du/dt\leq B3$. This situation is described by two simultaneous equations, $$B0\leq u(t;t_n)\leq B1, \quad \text{(A-29a)}$$

$$B2\Delta t\leq u(t;t_n)-u0\leq B3\Delta t, \quad \text{(A-29b)}$$

which may be implemented by the functional $$u\to\alpha\{u;a9;b9\}, \quad \text{(A-30a)}$$

$$a10(t)=\{\max\{B0, B2\Delta t+u0\}+\min\{B1, B3\Delta t\,u0\}\}/2, \quad \text{(A-30b)}$$

$$b10(t)=\{\min\{B1, B3\Delta t\,u0\}-\max\{B0, B2\Delta t\}\}/2. \quad \text{(A-30c)}$$

Class 11: $B0\leq u\leq B1$ and $B4\leq d^2u/dt^2\leq B5$. This situation is described by two simultaneous equations $$B0\leq u(t;t_n)\leq B1, \quad \text{(A-31a)}$$

$$B4(\Delta t)^2/2\leq u(t;t_n)-u'0\Delta t-u0\leq B5(\Delta t)^2/2, \quad \text{(A-31b)}$$

which may be implemented by the functional $$u\to\alpha\{u;a10;b10\}, \quad \text{(A-32a)}$$

$$a11(t)=\{\max\{B0, B4(\Delta t)^2/2+u'0\Delta t+u0\}+\min\{B1, B5(\Delta t)^2/2+u'0\Delta t+u0\}/2, \quad \text{(A-32b)}$$

$$b10(t)=\{\min\{B1, B5(\Delta t)^2/2+u'0\Delta t+u0\}-\max\{B0, B4(\Delta t)^2/2+u'0\Delta t+u0)/2. \quad \text{(A-32c)}$$

Class 12: $B2\leq du/dt\leq B3$ and $B4\leq d^2u/dt^2\leq B5$. This situation is described by two simultaneous equations $$B2\Delta t\leq u(t;t_n)-u'0\leq B3\Delta t, \quad \text{(A-33a)}$$

$$B4(\Delta t)^2/2\leq u(t;t_n)-u'0\Delta t-u0\leq B5(\Delta t)^2/2, \quad \text{(A-33b)}$$

which may be implemented by the functional $$u\to\alpha\{u;a11;b11\}, \quad \text{(A-34a)}$$

$$a12(t)=\{\max\{B2+u'0, B4(\Delta t)^2/2+u'0\Delta t+u0\}+\min\{B3+u'0, B5(\Delta t)^2\}/2+u'0\Delta t+u0\}/2, \quad \text{(A-34b)}$$

$$b12(t)=\{\min\{B3+u'0, B5(\Delta t)^2/2+u'0\Delta t+u0\}-\max\{B2+u'0, B4(\Delta t)^2/2+u'0\Delta t+u0)\}/2. \quad \text{(A-34c)}$$

Class 13: $B0\leq u\leq B1$ and $B2\leq du/dt\leq B3$ and $B4\leq d^2u/dt^2\leq B5$. This situation is described by three simultaneous equations $$B0\leq u(t;t_n)\leq B1, \quad \text{(A-35a)}$$

$$B2\Delta t\leq u(t;t_n)-u0\leq B3\Delta t, \quad \text{(A-35b)}$$

$$B4\Delta t\leq u(t;t_n)-u'0\Delta t-u0\leq B5\Delta t, \quad \text{(A-33c)}$$

which may be implemented by the functional $$u\to\alpha\{u;a12;b12\}, \quad \text{(A-36a)}$$

$$a13(t)=\{\max\{B0, B2\Delta t+u0, B4(\Delta t)^2+u'0\Delta t+u0\}+\min\{B1, B3\Delta t+u0, B5(\Delta t)^2/2+u'0\Delta t+u0\}\}/2, \quad \text{(A-36b)}$$

$$b13(t)=\{\min\{B1, B3\Delta t+u0, B5(\Delta t)^2/2+u'0\Delta t+u0\}-\max\{B0, B2\Delta t+u0, B4(\Delta t)^2/2+u'0\Delta t+u0\}\}/2. \quad \text{(A-36c)}$$

The defining differential equations (e.g., Eq. (A-1)) permit constrained solutions for $t\leq t_n$ as well as for $t\geq t_n$. The constrained solutions and recovery band boundary values FP(t; RB) are more conveniently used, beginning with an FP "initial value" on the reference trace FP(t;ref) or on a reference boundary trace FP(t;ref;CB;1 or 2) and computing the constrained solution in a backward-running direction. This may be accomplished in at least two manners; (1) compute constrained solutions $U(\tau;t_n)$ of Eq. (A-1) where the time variable $\tau$ runs backward, $\tau=t0-t$, and where t0 is selected "initial time value"); or (2) compute a new constrained solution U, defined by $$U(t;t_n)=u(\tau;t_n), \quad \text{(A-37a)}$$

$$\tau=t0-t, \quad \text{(A-37b)}$$

$$U(t=t0;t_n)=u(\tau 0;t_n)=u1, \quad \text{(A-37c)}$$

$$(dU/dt)_{t=t0}=-u'1, \quad \text{(A-37d)}$$

where $u(t;t_n)$ is the constrained solution computed in the preceding, t0 is a selected "initial time value," and u1 and u'1 are selected initial values. Here, the approach (2) with the particular choices $$\tau=(t_{zc}(n)+t_n)-t(t_n\leq t\leq t_{zc}(n)), \quad \text{(A-38a)}$$

$$t(\text{initial})=t_{zc}(n), \quad \text{(A-38b)}$$

$$\tau(\text{initial})=t_n, \quad \text{(A-38bc)}$$

$$u1=FP(t=t_{zc}(n);\text{ref}), \quad \text{(A-38d)}$$

$$u'1=-(d/dt)FP(t=t_{zc}(n);\text{ref}), \quad \text{(A-38e)}$$

will be used, but the approach (1), mutatis mutandis, should yield substantially the same results, The constrained solution $U(\tau)$ runs backward in time, beginning at the initial coordinates $(\tau=t_n, U(\tau=t_n)=FP(t=t_{zc}(n);\text{ref})$ and proceeding to a coordinate location $$(\tau=t_n+\Delta t(FP;\text{rec}), U(\tau=t_n+\Delta t(FP;\text{rec});t_n))=(t=t_{zc}(n)-\Delta t(FP;\text{rec}), u(t=t_{zc}(n)-\Delta t(FP;\text{rec});t_n), \quad \text{(A-39)}$$

which is identified as a boundary point for the recover band RB.

What is claimed is:

1. A method for monitoring and analyzing, in real time, variation with time of an aircraft flight parameter, the method comprising:

measuring a value $FP(t=t_p)$ of a selected flight parameter FP for an aircraft, for a time, $t=t_p$ that is equal to or adjacent to a present time;

providing a sequence $\{FP(t_n;\text{ref})\}_n$ of FP reference values for at least two time values, $t=t_n$ (n=n1, n2), and an available recovery time interval length $\Delta t(FP;\text{rec})$;

15 providing at least one constrained solution $u(t;t_n)$ for the FP on a graph $(t, u(t))$, with at least one initial constrained solution value $u(t=t_n;t_n)$ that is displaced from the corresponding value $FP(t=t_n;ref)$;

for each constrained solution $u(t;t_n)$, providing a reference curve-crossing time value, $t=t_{zc}(n)$, at which $u(t;t_n)$ crosses at least one trace of the reference values $FP(t;ref)$ on the graph;

computing a coordinate pair $(t,u)=(t_{zc}(n)-\Delta t(FP;rec), u(t_{zc}(n)-\Delta t(FP;rec);t_n))$ on the graph for the at least two time values, $t=t_n$ (n=n1, n2), and identifying this coordinate pair with at least one point on a recovery band boundary trace;

connecting at least two of the points with the coordinates $(t_{zc}(n)-\Delta t(FP;rec), u(t_{zc}(n)-\Delta t(FP;rec);t_n))$ to provide a portion of a recovery band boundary trace;

providing at least first and second non-coincident recovery band boundary traces, $(t,FP(t;rec;1))$ and $(t;FP(t;rec;2))$, that are spaced apart from each other for at least one time value t on the graph $(t, u(t))$;

displaying the at least first and second recovery band boundary traces, $(t,FP(t;rec;1))$ and $(t;FP(t;rec;2))$, and the value $FP(t=t_p)$ of the flight parameter at the time $t=t_p$ on the graph $(t, u(t))$; and providing an operator of the aircraft with information which may be used to bring the flight parameter FP within the recovery band defined by the first and second recovery band boundary traces.

2. The method of claim 1, further comprising:

providing a value $FP(t=t_p;\phi)$ of said selected FP parameter in a selected phase $\phi$ of a flight;

determining if the value $FP(t=t_p;\phi)$ likes between, or lies on, said first and second recovery band boundary traces;

when the value $FP(t=t_p;\phi)$ lies between said first and second recovery band boundary traces, or lies on at least one of said first and second recovery band boundary traces, interpreting this condition as indicating that said selected flight parameter is likely to be able to recover form the value $FP(t=t_p;\phi)$ to at least one of said FP reference values within a time interval of length no greater than $\Delta t(FP;rec)$.

3. The method of claim 1, further comprising:

providing a value $FP(t=t_p;100)$ of said selected FP parameter in a selected phase $\phi$ of a flight;

determining if the value $FP(t=t_p;\phi)$ lies between, or lies on, said first and second recovery band boundary traces;

when the value $FP(t=t_p;\phi)$ does not lie between said first and second recovery band boundary traces, and does not lie on at least one of said first and second recovery band boundary traces, interpreting this condition as indicating that said selected flight parameter is unlikely to be able to recover from the value $FP(t=t_p;\phi)$ to at least one of said FP reference values within a time interval of length no greater than $\Delta t(FP;rec)$.

4. The method of claim 1, further comprising providing said constrained quantity $u(t;t_n)$ for said FP value as a dimensionless ratio $FP(t)/FP0$, where $FP0$ is a selected measured or estimated value of said FP value.

5. The method of claim 1, further comprising providing said constrained value $u(t;t_n)$ for said flight parameter FP as a solution to a selected constrained differential equation $$B' \leq c2\{d^2u/dt^2\}+c1\{du/dt\}+c0\cdot u \leq B'',$$

16 where the coefficients c0, c1 and c2 are first, second and third numerical constants, at least one being non-zero, and B' and B'' are fourth and fifth numerical constants, at least one being non-zero.

6. A method for monitoring and analyzing, in real time, variation with time of an aircraft flight parameter the method comprising:

providing a recovery band in a graph of values $(t, u(t))$ of a measured flight parameter (FP) for an aircraft versus time t, the recovery band being defined by first and second non-coincident recovery band boundary traces that are spaced apart for at least one time value, and providing a recovery time interval length $\Delta t(FP;rec)$, having a positive temporal value, where the flight parameter, having a value $FP(t=t_p)$ at a time $t=t_p$, is likely to be able to recover to a reference flight parameter value $FP(t';ref)$, lying in a band of reference flight parameter values $FP(t';ref;CB)$, within a time interval given by $t_p \leq t' \leq t_p+\Delta t(FP;rec)$, if the flight parameter value lies between, or lies on, the first and second recovery band boundary traces; and displaying at least one of the recovery band on the graph and the recovery time interval length $\Delta t(FP;rec)$.

7. The method of claim 6, further comprising providing said reference flight parameter band as a curve having a width of substantially 0.

8. The method of claim 6, further comprising providing said quantity $w(t)$ in said graph as a dimensionless ratio $FP(t)/FP0$, where $FP0$ is a selected measured or estimated value of said FP value.

9. The method of claim 6, further comprising providing said value $w(t)$ for said flight parameter FP as a solution to a selected constrained differential equation $$B' \leq c2\{d^2w/dt^2\}+c1\{dw/dt\}+c0\cdot w \leq B'',$$

where the coefficients c0, c1 and c2 are first, second and third numerical constants, at least one being non-zero, and B' and B'' are fourth and fifth numerical constants, at least one being non-zero.

10. A method for monitoring and analyzing, in real time, variation with time of an aircraft flight parameter the method comprising:

providing a recovery band in a graph of values $(t, u(t))$ of a measured flight parameter (FP) for an aircraft versus time t, the recovery band being defined by first and second non-coincident recovery band boundary traces that are spaced apart for at least one time value, and providing a recovery time interval length $\Delta t(FP;rec)$, having a positive temporal value, where the flight parameter, having a value $FP(t=t_p)$ at a time $t=t_p$, is unlikely to be able to recover to a reference flight parameter value $FP(t';ref)$, lying in a band of reference flight parameter values $FP(t';ref;CB)$, within a time interval given by $t_p \leq t' \leq t_p+\Delta t(FP;rec)$, if the flight parameter value does not lie between, and does not lie on, the first and second recovery band boundary traces; and displaying at least one of the recovery band on the graph and the recovery time interval length $\Delta t(FP;rec)$.

11. The method of claim 10, further comprising providing said reference flight parameter band as a curve having a width of substantially 0.

12. The method of claim 10, further comprising providing said quantity $w(t)$ in said graph as a dimensionless ratio $FP(t)/FP0$, where $FP0$ is a selected measured or estimated value of said FP value.

13. The method of claim 10, further comprising providing said value w(t) for said flight parameter FP as a solution to a selected constrained differential equation $$B' \leq c2\{d^2w/dt^2\} + c1\{dw/dt\} + c0 \cdot w \leq B'',$$

where the coefficients c0, c1 and c2 are first, second and third numerical constants, at least one being non-zero, and B' and B'' are fourth and fifth numerical constants, at least one being non-zero.

14. A system for monitoring and analyzing, in real time, variation with time of an aircraft flight parameter, the system comprising a computer that is programmed:

to measure a value $FP(t_p)$ of a selected flight parameter FP for an aircraft, for a time, $t=t_p$ that is equal to or adjacent to a present time;

to provide a sequence $\{FP(t_n;ref)\}_n$ of FP reference values for at least two time values, $t=t_n$ (n=n1, n2), and an available recovery time interval length $\Delta t(FP;rec)$;

to provide at least one constrained solution $u(t;t_n)$ for the FP on a graph (t, u(t)), with at least one initial constrained solution value $u(t=t_n;t_n)$ that is displaced from the corresponding value $FP(t=t_n;ref)$;

for each constrained solution $u(t;t_n)$, to provide a reference curve-crossing time value, $t=t_{zc}(n)$, at which $u(t;t_n)$ crosses at least one trace of the reference values $FP(t;ref)$ on the graph; and to compute a coordinate pair $(t,u)=(t_{zc}(n)-\Delta t(FP;rec), u(t_{zc}(n)-\Delta t(FP;rec); t_n))$ on the graph for the at least two time values, $t=t_n$ (n=n1, n2), and to identify this coordinate pair with at least one point on a recovery band boundary trace;

to connect at least two of the points with the coordinates $(t_{zc}(n)-\Delta t(FP;rec), u(t_{zc}(n)-\Delta t(FP;rec); t_n))$ to provide a portion of a recovery band boundary trace;

to provide at least first and second non-coincident recovery band boundary traces, (t,FP(t;rec;1)) and (t;FP(t;rec;2)), that are spaced apart form each other for at least one time value t on the graph (t, u(t)); and to display the at least first and second recovery band boundary traces, (t,FP(t;rec;1)) and (t;FP(t;rec;2)), and the value $FP(t=t_p)$ of the flight parameter at the time $t=t_p$ on the graph (t, u(t)); and to provide an operative of the aircraft with information which may be used to bring the flight parameter within the recovery band defined by the first and second recovery band boundary traces.

15. The system of claim 14, wherein said computer is further programmed:

to provide a value $FP(t=t_p;\phi)$ of said selected FP parameter in a selected phase $\phi$ of a flight;

to determine if the value $FP(t=t_p;\phi)$ lies between, or lies on, said first and second recovery band boundary traces; and wherein the value $FP(t=t_p;\phi)$ lies between said first and second recovery band boundary traces, or on at least one of said first and second recovery band boundary traces, to interpret this condition as indicating that said selected flight parameter is likely to be able to recover form the value $FP(t=t_p;\phi)$ to at least one of said FP reference values within a time interval of length no greater than $\Delta t(FP;rec)$.

16. The system of claim 14, wherein said computer is further reprogrammed:

to provide a value $FP(t=t_p;\phi)$ of said selected FP parameter in a selected phase $\phi$ of a flight;

to determine if the value $FP(t=t_p;\phi)$ lies between, or on, said first and second recovery band boundary traces;

when the value $FP(t=t_p;\phi)$ does not lie between said first and second recovery band boundary traces, and does not lie on at least one of said first and second recovery band boundary traces, to interpret this condition as indicating that said selected flight parameter is unlikely to be able to recover from the value $FP(t=t_p;\phi)$ to at least one of said FP reference values within a time interval of length no greater than $\Delta t(FP;rec)$.

17. A system for monitoring and analyzing, in real time, variation with time of an aircraft flight parameter the system comprising a computer that is programmed:

to provide a recovery band as a graph of values (t, u(t)) of a measured flight parameter (FP) for an aircraft versus time t, the recovery band being defined by first and second non-coincident recovery band boundary traces that are spaced apart at at least one time value, and to provide a recovery time interval length $\Delta t(FP;rec)$, having a positive temporal value, where the flight parameter, having a value $FP(t=t_p)$ at a time $t=t_p$, is likely to be able to recover to a reference flight parameter value $FP(t',ref)$, lying in a band of reference flight parameter values $FP(t';ref;CB)$, within a time interval given by $t_p \leq t' \leq t_p + \Delta t(FP;rec)$, if the flight parameter value lies between, or on, the first and second recovery band boundary traces; and to display at least one of the recovery band on the graph and the recovery time interval length $\Delta t(FP;rec)$.

18. The system of claim 17, wherein said compute is further programmed to provide said reference flight parameter band as a curve having a width of substantially 0.

19. A system for monitoring and analyzing, in real time, variation with time of an aircraft flight parameter the system comprising a computer that is programmed:

to provide a recovery band as a graph of values (t, u(t)) of a measured flight parameter (FP) for an aircraft versus time t, the recovery band being defined by first and second non-coincident recovery band boundary traces that are spaced apart at at least one time value, and to provide a recovery time interval length $\Delta t(FP;rec)$, having a positive temporal value, where the flight parameter, having a value $FP(t=t_p)$ at a time $t=t_p$, is unlikely to be able to recovery to a reference flight parameter value $FP(t',ref)$, lying in a band of reference flight parameter values $FP(t';ref;CB)$, within a time interval given by $t_p \leq t' \leq t_p + \Delta t(FP;rec)$, if the flight parameter value does not lie between the first and second recovery band boundary traces; and to display at least one of the recovery band on the graph and the recovery time interval length $\Delta t(FP;rec)$.

20. The system of claim 19, wherein said computer is further programmed to provide said reference flight parameter band as a curve having a width of substantially 0.

* * * * *